Patented July 4, 1944

2,352,740

UNITED STATES PATENT OFFICE 2,352,740

METHOD OF IMPREGNATING BAMBOO WITH SYNTHETIC RESIN

Harvey D. Shannon, Westfield, N. J., assignor to Bakelite Corporation, New York, N. Y., a corporation of New Jersey No Drawing. Application May 14, 1940,
Serial No. 335,137

4 Claims. (Cl. 117—59)

This invention relates to the impregnation of bamboo with synthetic resins and to the product produced thereby.

It is often desirable to impregnate bamboo with synthetic resins of known characteristics in order to impart to it desired properties and yet retain in the bamboo substantially all of the natural resins which were originally present.

Dried bamboo comprises bundles of fibers running lengthwise of the stalk and the fibrils are extremely difficult to impregnate. Disposed throughout the fibers, cells and cell walls are the natural resins of the bamboo together with various salts which are deposited as the water of the sap evaporates from the bamboo as it is dried. The resins in the bamboo are desirable as they have somewhat of a binding effect on the fibers but the water soluble salts have no particular advantage. The membranes of the cell walls are porous to water as is evident from the fact that bamboo can be thoroughly dried.

Difficulty has heretofore been experienced in impregnating bamboo with synthetic resins of known characteristics. It has heretofore been proposed with regard to wood to dissolve a resin in an organic solvent, for instance alcohol and force the solution into the cells of the wood; however, this has not been effective with regard to bamboo probably because of the action of the membranes and the difficulty in impregnating the fibrils. Again with regard to wood, it has been proposed to treat the wood with a solution of one of the constituents of the synthetic resin, for instance hexamethylenetetramine, then dry the wood and then treat the wood with an alcoholic solution of a fusible synthetic resin, after which the wood is again dried and thereafter heated to react the fusible resin with the hexamethylenetetramine and form a hardened synthetic resin in situ. In coating wood it has also been proposed to dip the wood in a solution of the unreacted constituents of the resin to obtain a superficial coating.

The objections to the first method of treating wood, namely the treatment with synthetic resin dissolved in an organic solvent is that the solvent is expensive, it does not penetrate the cell walls or enter the fibrils as well as water, the solvent is flammable, and also the solvent has a tendency to dissolve the natural wood resins which it is desired to retain in the wood and it does not dissolve the salts which it is desired to remove from the wood. The difficulty with the other methods of impregnating wood is that one can never be certain as to how much of the resin constituents are retained in the wood and therefore one never knows the characteristics of the resin which will be formed and hence one does not know the characteristics which will be imparted to the wood after the treatment. Moreover, the second mentioned treatment is expensive in that it requires alternate drying and soaking of the wood. The difficulties experienced with wood are multiplied in connection with bamboo due to its peculiar fibrous structure.

According to the present invention, a method has been devised for impregnating bamboo with a resin of known characteristics to the end that a final product of known characteristics may be obtained. Furthermore, the method is extremely simple and low in cost and is operable under conditions where vacuum and pressure treatments have been ineffective in thoroughly impregnating the bamboo. Moreover, the treatment does not remove from the bamboo the natural resins which it is desired to retain but does remove the water soluble salts, which do not strengthen the bamboo, and permits their replacement by synthetic resins of known characteristics which impart known, predetermined and desired characteristics to the bamboo.

In treating the bamboo, it is soaked in water until it is thoroughly saturated which usually occurs in from two to four days for a piece about ¼ inch in thickness. The usual tap water may be used for this treatment and it is unnecessary to use specially purified water such as distilled water. It has also been found desirable to use warm water, for instance water maintained at a temperature of approximately 60° C. in which case the water absorption may occur in approximately 24 hours. If desired, the water may be circulated through the receptacle in which the bamboo is treated in order to have a fresh supply of water next to the bamboo and prevent concentration of the salt solution next to the surface of the bamboo. After the bamboo has been thoroughly soaked in water and the salts have had an opportunity to dissolve, the water is merely drained or wiped from the surface of the bamboo but the bamboo is not permitted to dry to any material extent.

After the water is wiped from the bamboo, the piece to be treated is immersed in a water solution of a synthetic resin. Resins of this type may be obtained by reacting a phenolic constituent for instance phenol, cresol, resorcinol, etc. or a urea constituent for instance urea, thiourea, etc. with a reactive aldehyde for instance formaldehyde, paraform etc. but stopping the reaction before the resin has become water insoluble, that is the reaction is continued to the point where one of the constituents has chemically reacted with the other but enlargement of the molecule and polymerization has not taken place sufficiently to render the resin water insoluble. The preferred resin is inherently water soluble. It is important that the reaction does not go too far and it is preferred that the reaction be stopped as soon as the constituents of the resin have combined and before there is any substantial amount of polymerization or enlargement of the molecule. The water soluble resins may in fact be dispersions of the resin in the water but the resin is in such a condition that the watery mass has the characteristics of a solution so far as the present invention is concerned, as the resin is miscible with the water to give a homogeneous mass. Such a mass is contemplated by the term "solution" and similar terms used herein.

The wet bamboo is permitted to remain in this resin solution for a period of time depending upon the thickness of the bamboo. A section of bamboo approximately ¼ of an inch thick will automatically impregnate itself in approximately two to four days by soaking at room temperature or at about 60° C. in a water solution containing about 30% of synthetic resin. The resin solution appears to diffuse throughout the bamboo and passes through the membrane walls and enters the fibrils by osmosis or a physiochemical phenomena which is similar thereto. Whatever the physical or chemical phenomena may be, however, it has been found that bamboo can be impregnated by this method whereas very little more than a surface layer can be impregnated by immersing dry bamboo in the resin solution, even though alternate vacuum and pressure be used in an effort to assist the impregnation. It is considered probable that when the dry bamboo is immersed in a resin solution, the water passes through the membrane building up a layer of resin molecules on the outside of the membrane, and these molecules quickly become interlocked to form such aggregates that thereafter they will prevent further penetration of the resin molecules through the membrane whereas with a section of bamboo previously soaked in water, the resin infiltration is so gradual that molecules do not build up such an interlocking structure but retain their small size and are enabled to pass through the membrane and into the fibrils and thoroughly impregnate the bamboo.

After the bamboo has been treated in the resin-water solution, the solution is withdrawn and the bamboo is permitted to drain. The bamboo may then be permitted to dry or, if desired, may quickly be flushed with water containing no resin or wiped to remove the surface layer of resin. It is usually preferred, however, to retain the resinous surface layer. Thereafter, the bamboo is permitted to dry and is subsequently heat treated to polymerize the resin to the desired extent. Also, the wet bamboo, after the resin treatment, may be warmed slightly to polymerize the resin while the moisture is present and this heating may take place in a humidity chamber where the evaporation of the water may be controlled. Permitting the bamboo to dry prior to heat treatment has a tendency to withdraw the resin from the center of the bamboo and concentrate it near the surface and thus provide a graduated resin distribution, although leaving a portion of the resin at the center. This is because as the moisture moves from the interior of the bamboo to the surface it carries the resin with it. Polymerizing the resin before the water has escaped enlarges the molecules sufficiently to prevent their passage through the membrane or out of the fibrils and there is a heavier concentration of resin in these places.

By proceeding in the manner described herein it has been found possible to control the characteristics of the final product. The treated bamboo is somewhat heavier than the untreated material but is much stronger and, on the basis of equal strengths, a piece of bamboo treated in this manner is lighter in weight than untreated bamboo. The finished product may be used for poles for pole vaulting, oars, sailboat masts, shafts of golf clubs and polo mallets, bristles for brushes, etc. Where the resin is baked hard after the woody base material is treated, the composite has great dimensional stability under any atmospheric condition and is resistant to abrasion; it is therefore useful for propellers and other parts of aircraft, patterns for casting, phonograph needles, etc.

Although a particular and preferred form of the invention has been described, it is recognized that many other forms may be used. For instance a cellulosic wetting agent may be used with the water as well as other solvents for the resin. Furthermore, as previously stated, the invention, while particularly applicable to bamboo which has not been successfully treated by other methods, is applicable to other woody materials, for instance balsa wood and the more common woods. It is therefore desired that the invention be construed as broadly as the following claims taken in conjunction with the prior art may allow.

I claim:

1. Method of impregnating bamboo containing cells and membraneous cell walls with a synthetic resin of the group consisting of phenolic aldehyde resins and urea aldehyde resins, which comprises soaking the bamboo in water until the cells and cell walls are impregnated with water and thereafter, without substantial drying of the bamboo, soaking it in a watery solution comprising the synthetic resin until the cells and cell walls are impregnated with the resin, and insolubilizing the resin and depositing it within and around the cells and cell walls.

2. Method of impregnating bamboo containing cells and membraneous cell walls with a synthetic resin of the group consisting of phenolic aldehyde resins and urea aldehyde resins, which comprises soaking the bamboo in water until the cells and cell walls are impregnated with water and thereafter, without substantial drying of the bamboo, soaking it in a watery solution comprising the synthetic resin until the cells and cell walls are impregnated with the resin, heating the treated bamboo in a humid atmosphere to decrease travel of the resin to the surface of the bamboo and to insolubilize the resin and deposit it within and around the cells and cell walls.

3. Method of impregnating bamboo containing cells and membraneous cell walls with a synthetic resin of the group consisting of phenolic aldehyde resins and urea aldehyde resins while retaining in the bamboo the natural resin, which comprises soaking the bamboo in water until the cells and cell walls are impregnated with water and thereafter, without substantial drying of the bamboo, soaking it in a watery solution comprising the synthetic resin until the cells and cell walls are impregnated with the synthetic resin, drying the treated bamboo and insolubilizing the synthetic resin and depositing it within and around the cells and cell walls.

4. Method of impregnating bamboo containing cells and membraneous cell walls with a synthetic resin of the group consisting of phenolic aldehyde resins and urea aldehyde resins and of removing water-soluble elements from the bamboo, which comprises soaking the bamboo in water until the cells and cell walls are impregnated with water and said elements are dissolved out of the bamboo and thereafter, without substantial drying of the bamboo, soaking it in a watery solution comprising the synthetic resin until the cells and cell walls are impregnated with the resin, and insolubilizing the resin and depositing it within and around the cells and cell walls.

HARVEY D. SHANNON.